No. 744,909. PATENTED NOV. 24, 1903.
G. DETTMAR.
VELOCITY METER.
APPLICATION FILED MAY 4, 1903.
NO MODEL.
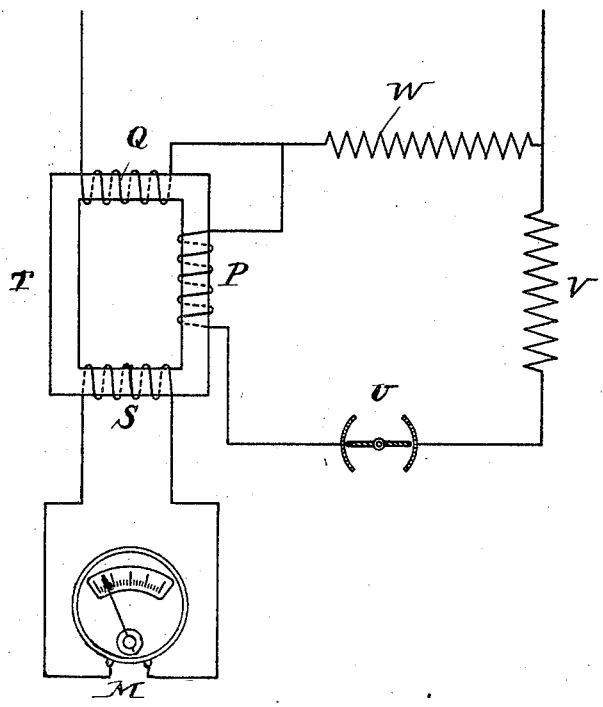

No. 744,909. Patented November 24, 1903.

UNITED STATES PATENT OFFICE.

GEORG DETTMAR, OF FRANKFORT-ON-THE-MAIN, GERMANY, ASSIGNOR TO ELECTRICITÄTS ACTIEN GESELLSCHAFT, VORM. W. LAHMEYER & CO., OF FRANKFORT-ON-THE-MAIN, GERMANY.

VELOCITY-METER.

SPECIFICATION forming part of Letters Patent No. 744,909, dated November 24, 1903.

Application filed May 4, 1903. Serial No. 155,665. (No model.)

*To all whom it may concern:*

Be it known that I, GEORG DETTMAR, a subject of the German Emperor, residing and having my post-office address at 45 Hoechsterstrasse, Frankfort-on-the-Main, Germany, have invented certain new and useful Improvements in Velocity-Meters, of which the following is a specification.

This invention relates to means for applying the variation of the induction of induction-coils which inclose a magnetic circuit—for example, choking-coils—to the measurement of the velocity of bodies. It is already known that the variation of the induction of such coils can be effected by providing them with a second winding, which is traversed by a direct current of electricity, so that by varying the excitation it is possible to vary the field strength, and consequently the induction, of the coil. If, for instance, the magnetic field be completely saturated by the direct-current winding, the induction is almost *nil;* but if the direct-current circuit be entirely switched out the induction attains its maximum value. It is then possible to adjust the apparatus for any required value of induction. The said variation can be carried out in practice in various ways and is especially valuable where an induction-coil having a variable induction has to be used.

The foregoing can be applied with great advantage to the tachymeters whose construction is based on electrical principles and in which the body in motion is caused directly or indirectly to periodically make and break an electric circuit having induction, the amplitude of oscillation of a measuring instrument included in this circuit giving the measurement of the velocity of the moving body. The application of this invention to tachymeters of this character renders their indications independent of the fluctuations of pressure whatever the origin of these fluctuations may be.

The accompanying drawing illustrates an application in accordance with the present invention.

The moving body whose velocity is to be measured is provided with a current-interrupter U, connected to the primary winding P of a standardized measuring instrument indicating the speed of the current-interrupter. The primary winding P and interrupter U are in parallel with a shunt resistance W and in series with a reducing resistance V. In the same circuit as the first-named resistance W is a compensating coil Q, arranged on the transformer, which coil Q is traversed by an uninterrupted direct current, the primary coil P and the secondary coil of the measuring instrument being traversed by currents of fluctuating intensity while the interrupter U is rotating. The working of this arrangement as regards the primary and secondary coils and their coöperation with the current-interrupter and the result obtained by the measuring instrument M will be easily understood from the foregoing description. The purpose which the reducing resistance V and the shunt resistance W fulfil in this arrangement is to avoid the sparking caused at the interrupter by the first-named resistance, while the second-named resistance increases the accuracy of the measuring instrument.

The operation of the arrangement is as follows: The voltage of the secondary coil depends on the variation in the number of lines of force passing through the transformer T in a unit of time, and this variation itself depends on the number of ampere-turns in the primary coil P, the frequency being presumed to be constant. Disregarding for the time the compensating resistance Q and supposing that the voltage at the terminals varies between +M and −M, there will be a corresponding variation of ampere-turns in the interrupter-circuit, which variation will be from zero to the maximum, and there will also be an induction in the transformer which will vary between zero and a maximum value (B') of the induction, corresponding to a maximum value (A W') of the number of ampere-turns. If now the potential at the terminal varies, the number of the ampere-turns varies also in the primary, together with the induction on the transformer T. In fact, all the elements of the circuit will vary in the same sense as the terminal voltage—that is to say, with equal number of revolutions or interruptions the secondary voltage increases and decreases as the terminal voltage increases and decreases, while the oscillation of the measuring instrument M likewise varies with the terminal voltage. If now the aforesaid compensating coil Q be placed in the transformer T, as shown on the accompanying diagram, the number of ampere-turns of the compensating coil acts additively with the variable number of ampere-turns of the primary P of the transformer. The induction of the transformer then does not fluctuate between zero and the maximum value, but varies between a minimum and a maximum value, which I will call "B minimum" and "B maximum," respectively. The higher the degree of saturation arising from the compensating coil Q the lesser the difference between B minimum and B maximum for various points of the magnetizing curve obtained for various terminal voltages. This difference becomes smaller as the magnetizing which takes place corresponds to the straight portion of the magnetizing curve. It is therefore possible to so arrange the apparatus that a variation of voltage taking place within extended limits remains without influence, as it is possible, owing to the shape of the magnetizing curve, to maintain constant the difference between B maximum and B minimum for terminal voltages varying between wide limits. The secondary voltage, which for equal number of revolutions of the interrupter depends solely upon the aforesaid difference, will therefore remain constant.

The measuring instrument M is indicated diagrammatically and may be of any of the well-known types—as, for instance, one known as the heating-wire instrument or electromagnetic instrument or any other equivalent and well-known instrument.

Having now particularly described and ascertained the nature of the said invention and in what manner the same is to be performed, I declare that what I claim is—

1. A velocity-meter comprising a transformer, an induction-circuit including the primary winding and a compensating winding of the transformer, means for varying said circuit, and a measuring instrument connected with the secondary winding of the transformer, substantially as described.

2. A velocity-meter comprising a transformer, an induction-circuit including the primary winding and a compensating winding of the transformer, means for making and breaking said circuit, a shunt resistance in parallel with said means, and a measuring instrument connected to the secondary winding of the transformer, substantially as described.

3. A velocity-meter comprising a transformer, an induction-circuit including the primary winding and a compensating winding of the transformer, and means for making and breaking said circuit, a resistance in shunt to said means, a reducing resistance in series with said means, and a measuring instrument connected to be operated by the transformer, substantially as described.

In testimony whereof I have signed my name to this specification in the presence of two subscribing witnesses.

GEORG DETTMAR.

Witnesses:
  MICHAEL VOLK,
  JEAN GRUND.